United States Patent [19]
Norvell

[11] Patent Number: 5,811,167
[45] Date of Patent: Sep. 22, 1998

[54] PACKAGED INSULATION AND METHOD OF MAKING SAME

[75] Inventor: Jean Norvell, Newark, Del.

[73] Assignee: W. L. Gore & Associates, Inc., Newark, Del.

[21] Appl. No.: 591,812

[22] Filed: Jan. 25, 1996

[51] Int. Cl.[6] .................................................. B32B 3/10
[52] U.S. Cl. ............................ 428/76; 428/74; 428/99; 428/136; 428/137; 52/404.2; 52/406.2
[58] Field of Search ............................ 428/137, 74, 76, 428/99, 136; 52/406.2, 404.2

[56] References Cited

U.S. PATENT DOCUMENTS

| | | | |
|---|---|---|---|
| 1,928,867 | 10/1933 | Paine et al. | 428/74 |
| 2,095,626 | 10/1937 | Bassett et al. | 20/4 |
| 2,581,625 | 1/1952 | Brady | 244/129 |
| 2,739,412 | 3/1956 | Ballonoff | 428/137 |
| 2,781,820 | 2/1957 | Rogers | 428/74 |
| 3,085,666 | 4/1963 | Lydard | 189/86 |
| 3,403,428 | 10/1968 | Sheffer | 24/161 |
| 3,829,150 | 8/1974 | Moore | 296/39 A |
| 3,953,566 | 4/1976 | Gore | 264/288 |
| 3,962,153 | 6/1976 | Gore | 260/2.5 R |
| 4,096,227 | 6/1978 | Gore | 264/210 R |
| 4,187,390 | 2/1980 | Gore | 174/102 R |
| 4,251,961 | 2/1981 | Deibele | 52/63 |
| 4,305,988 | 12/1981 | Kocher | 428/158 |
| 4,466,224 | 8/1984 | Hague | 42/478 |
| 4,617,776 | 10/1986 | Bergstrom | 52/690 |
| 4,756,945 | 7/1988 | Gibb | 428/124 |
| 4,933,225 | 6/1990 | Abe | 428/157 |
| 5,102,711 | 4/1992 | Keller | 428/76 |
| 5,300,178 | 4/1994 | Nelson et al. | 156/292 |
| 5,343,663 | 9/1994 | Larrea et al. | 52/506.02 |
| 5,376,441 | 12/1994 | Wu et al. | 428/304.4 |
| 5,385,694 | 1/1995 | Wu et al. | 252/312 |
| 5,426,869 | 6/1995 | Gore et al. | 36/22 R |
| 5,444,959 | 8/1995 | Tesch | 52/794.1 |
| 5,460,872 | 10/1995 | Wu et al. | 428/304.4 |
| 5,472,760 | 12/1995 | Norvell | 428/71 |

*Primary Examiner*—Alexander Thomas
*Attorney, Agent, or Firm*—Carol A. Lewis White

[57] ABSTRACT

An improved insulation package is provided that is particularly suitable for use on vehicles, such as aircraft. The insulation package includes a liquid impenetrable cover over thermal or acoustical insulation material. In order to facilitate mounting of the insulation package, the cover includes at least one sealed region that can be penetrated with a hole without compromising the waterproofness of the package. The sealed region can be provided along the edge of the insulation material, such as by way of a tab, or can be provided anywhere on the face of the insulation by forming suitable holes in the insulation. Elongated sealed regions can also be provided so as to allow for bending or slitting of the packaged insulation.

6 Claims, 2 Drawing Sheets

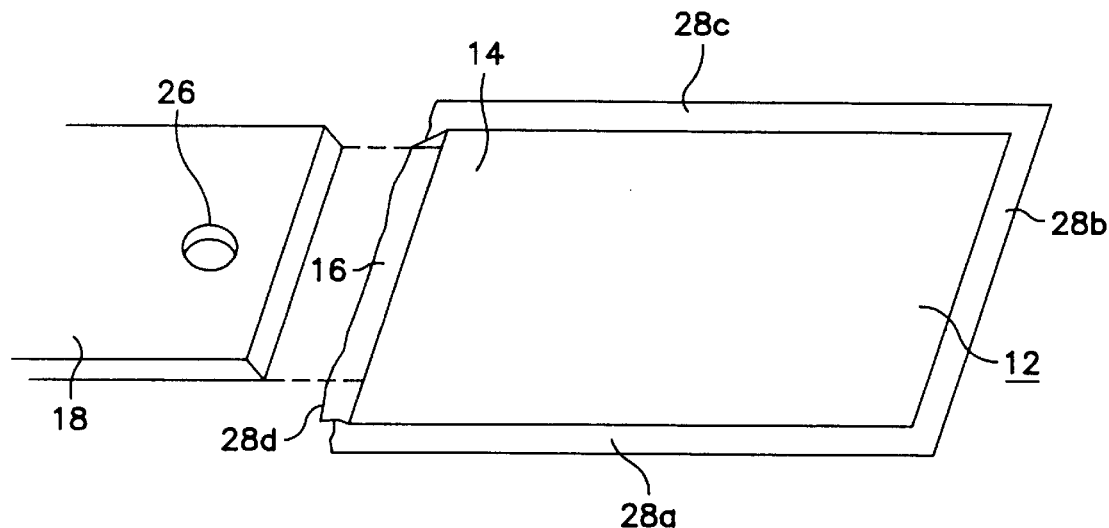
FIG. 5
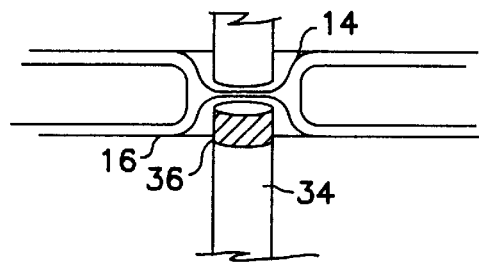
FIG. 6
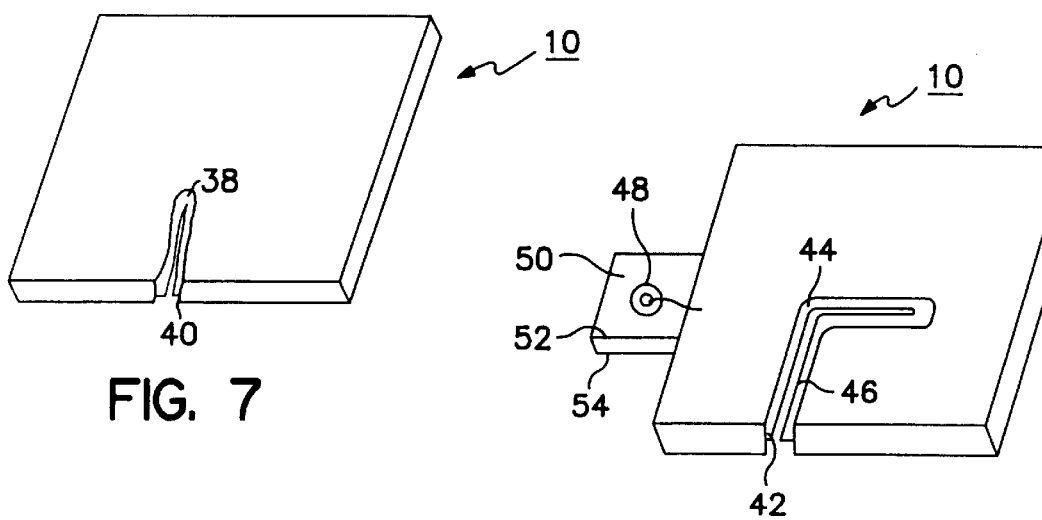
FIG. 7
FIG. 8

PACKAGED INSULATION AND METHOD OF MAKING SAME

BACKGROUND OF THE INVENTION

1. Field of the Invention

The present invention relates to packaged insulation, such as that employed in vehicles, and especially aircraft and the like, and methods of manufacturing the same.

2. Description of Related Art

Many vehicles employ insulation to provide sound and thermal insulation to their passenger and/or cargo areas. Such insulation is used in cars, trains, ships, and aircraft. Optimizing the insulating characteristics of vehicles is of constant interest in any vehicle design, but is of particular interest in aircraft design due to the extreme sound and thermal demands encountered by aircraft.

Jet aircraft that cruise at high altitudes normally encounter temperatures on their external skin of minus 40° to minus 60° C. or less. Inside the cabin of the aircraft, however, temperatures are generally in the 20° C. range, in spite of the frigid air outside which is only a few inches removed from the interior cabin wall. A comfortable temperature can be maintained within the cabin with the help of insulation, usually of fiberglass or polyimide foam, which is inserted between the cabin walls and the aircraft's skin.

The insulation is used both as an acoustic and thermal insulating component, attached and supported across ribs or "stringers" of the aircraft, or inserted into wells that are the areas between the skin and the supporting structure of stringers and frame. As used in this application, the term "stringer" is intended to mean any support component spaced between the framing segments of a vehicle's fuselage or outer skin.

Because of aerodynamic requirements, the walls of an aircraft are normally formed in a curve. During use, insulation blankets placed within the walls tend to slide along the curve of the wall. When this occurs, an uninsulated gap will form near the top of the wall and the insulation blanket will tend to bunch upon itself at the bottom of the wall.

In order to rectify this problem, airframe manufacturers have devised a series of attachment devices that impale the insulation and then attach the device to the airframe to ensure that the insulation will not slip. These attachment devices penetrate through the entire insulation blanket, as well as the vapor barrier covering it. While this attachment method improves slippage problems, it tends to worsen moisture accumulation problems within the vehicle.

A growing concern in the aircraft industry is the accumulation of moisture within aircraft. Moisture in the aircraft, from normal respiration as well as food services, rest room facilities, etc., tend to migrate to the skin of the aircraft and condense in the insulation. Insulation wetness causes loss of thermal and acoustical properties, weight gain in the aircraft over multiple flights, and eventual corrosion of the aircraft itself. Wetness within the insulation results from a physical law that hot air will diffuse toward cold air. The extreme temperature difference between the cabin and the aircraft's skin causes the warm air to be attracted to the cold surface, which leads to condensation of moisture in the air within the insulation. Water that then becomes trapped in the insulation diminishes the insulative properties of the insulation and often puddles within the aircraft—leading to corrosion or dripping onto passengers.

Many attempts have been made to control this problem, including the use of vapor barriers that encapsulate the entire insulation blanket and in theory should preclude all moisture entry into the insulation. Vapor barriers used within the aircraft industry, mainly consisting of polyester films or an aluminum layer deposited on a polyester film, serve as the outer covering layer of the insulation blanket. These films can be heat sealed to themselves, or they have an adhesive layer that can be sealed with heat and pressure around the blanket edges. Unfortunately, these seals are not very strong in application, and often tear and fail during use. The primary problem has been that pressure changes of ascent and descent causes the covers to balloon and contract, resulting in stressing of the seals to failure as air within the insulation blankets endeavors to come to equilibrium with the cabin.

Because of seal failure, current insulation blankets often have holes formed in their covers to accommodate pressure changes and to relieve the stress on the seals. These deliberate openings are dubbed "breather holes" by the aircraft industry. The addition of these holes solves the equilibrium problem, but also allow unhampered entry of moisture into the blanket via the holes and the subsequent formation of condensation within the blanket. This condition is additionally exacerbated when numerous additional holes are made by the attachment devices needed to secure the blankets.

The result has been accumulation of water within the blankets via moisture ingress through the holes, loss of both thermal and acoustical insulation properties, and excess water dripping onto passengers.

U.S. Pat. No. 5,426,869 to Norvell and co-pending U.S. patent Application 08/414,639, now abandoned, to Norvell seek to remedy this general problem of moisture ingress by devising an air permeable, moisture vapor permeable waterproof covering system which exclude all liquids, but allow for pressure changes during ascent and descent without the necessity of breather holes. While this system works quite well, it does not address instances where insulation is held in place by a hook penetrating through the insulation blanket.

Additionally, it may be desirable to provide specialized package designs with holes, slits, or openings to allow the insulation to be folded back for inspection without removing the entire blanket, since it is often positioned around or routed through for electrical wiring, hydraulic lines, plumbing, odd-shaped structures in the wall, etc.

It is a purpose of the present invention to provide an improved insulative blanket for vehicles and the like that can provide benefits over previous insulative blanket designs. This and other purposes of the present invention will become evident from review of the following specification.

SUMMARY OF THE INVENTION

The present invention provides an improved insulation package that prevents water entry into the package by establishing a waterproof seal around areas that will be penetrated with attachment devices. Further, the package of the present invention provides waterproof construction of slits, folds, holes, and the like that are used to allow access to wiring, hydraulic lines or other systems subject to periodic inspection.

The insulation package of the present invention comprises an insulative material wrapped in a liquid impenetrable cover that further includes selective points or regions where a top and a bottom portion of the cover are sealed to each other through a hole (e.g., gap, slit, etc.) in the insulation material. These points or regions of cover adherence through the insulative material allow openings to be readily formed through the insulative package without any risk of leakage into the insulative material or tearing of the cover during use.

The preferred process of practicing the present invention comprises the following steps. First a segment of insulation is cut to the appropriate shape and size for an insulation package. At a predetermined attachment site, a hole is made through the entire depth of the insulation. The insulation is inserted into a cover, which is sealed completely around the insulation material to form a liquid impenetrable package.

The location of the hole in the insulation is then located and the hole is placed over a protuberance, such as that made by a dow, for subsequent sealing. The protuberance should be proportioned to be close to the same size as the hole.

A first side of the cover is placed over the top of the protuberance at the hole location, and the cover is slightly pushed up within the interior of the hole. The opposite second side of the cover is then pushed down to meet the first layer bottom layer, so both segments are sifting atop the protuberance.

Using a sealing unit, a waterproof seal is made by bonding the first and second sides of the cover together against the protuberance. A waterproof, seal results, centered within the hole punched out of the insulation. The center of this seal is easily pierced with an attachment device without destroying the integrity of the remainder of the waterproof seal surrounding it.

This approach to sealing around necessary holes, slits and openings in the insulation can be duplicated by cutting out the segment of the insulation needing to be opened up or folded back. The insulation is then put within the external cover, which is already sealed at its periphery on three sides. A waterproof seal can then be made, with sealed margins following the appropriate shape of the slit or opening.

The seal of the present invention is vastly superior to anything previously provided on insulation packages. Since the seal is completely waterproof across at least several centimeters where the two sides of the cover are joined together, a hole can be easily formed in the seal without risk of moisture migrating into the insulation through the hole. Additionally, the seal tends to simultaneously reinforce the insulation cover, reducing the chance that tears will propagate from the hole during use.

DESCRIPTION OF THE DRAWINGS

The operation of the present invention should become apparent from the following description when considered in conjunction with the accompanying drawings, in which:

FIG. 5 is an exploded view of the insulation material shown in FIG. 3 being inserted into a partially sealed insulation over of the present invention;

FIG. 6 is a cross-section view of an insulation package showing the sealing step employed in the present invention;

FIG. 7 is a three-quarter perspective view of another embodiment of an insulation package of the present invention; and FIG. 8 is a three-quarter perspective view of still another embodiment of an insulation package of the present invention.

DETAILED DESCRIPTION OF THE INVENTION

The present invention is an improved packaged insulation for use in a variety of applications, but particularly suitable for use in insulating vehicles and like structures where pre-packaged insulation blankets are desirable for ease in installation and maintenance.

Figure 1:
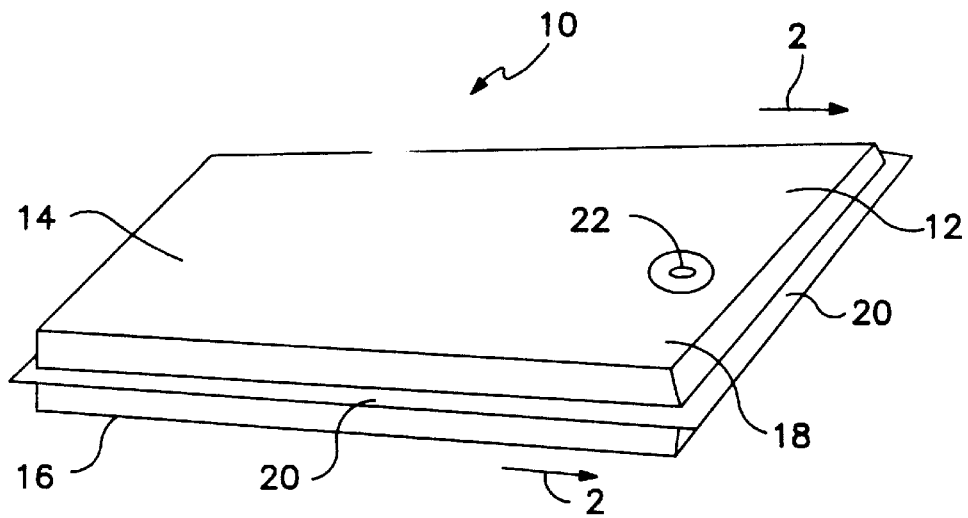
FIG. 1 is a three-quarter perspective view of an insulation package of the present invention.
Figure 2:
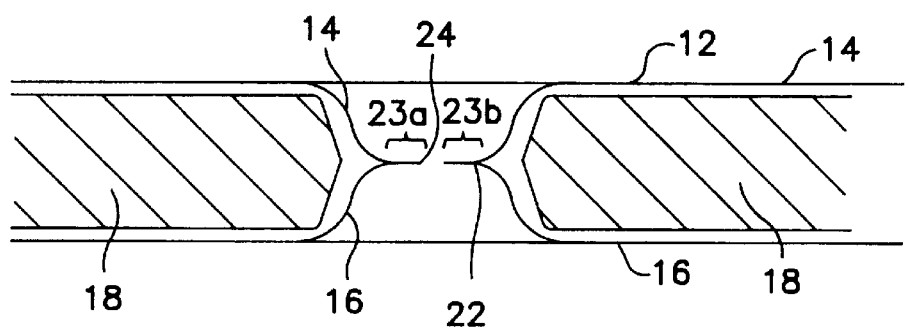
FIG. 2 is an enlarged cross-section view along line 2—2 of FIG. 1.
Figure 4:
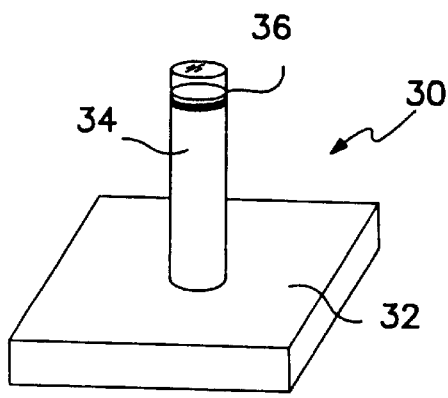
FIG. 4 is a three-quarter isometric view of a protuberance jig for use in the formation of the insulation package of the present invention.

Shown in FIGS. 1 and 2 is an insulation package 10 of the present invention. The insulation package 10 comprises an outer cover 12, having a top layer 14 and a bottom layer 16, surrounding an insulation material 18. The use of directional terms such as "top" and "bottom" as employed in the present application is merely intended to provide a convenient short description of the general positioning of various components of the present invention. These directional terms are not intended to in any way limit how the present invention may be employed or the actual orientation of the insulation package of the present invention in operation.

The cover 12 should be a completely liquid impenetrable material, such as a non-porous, moisture impermeable polymeric material such as polyethylene, polyester, polypropylene, etc., laminated to a textile substrate, woven or non-woven such as nylon, polypropylene, etc. Preferably, the cover 12 comprises at least in part a water impenetrable and moisture vapor permeable material.

Most preferably, the cover 12 comprises a laminate of expanded polytetrafluoroethylene (PTFE), such as that described in U.S. Pat. Nos. 3,953,566, 3,962,153, 4,096,227, and 4,187,390, all incorporated by reference. Expanded PTFE laminate materials, such as those sold under the trademark GORE-TEX® fabric by W. L. Gore & Associates, Inc., Elkton, Md., have been shown to be extremely effective at preventing the passage of liquid water while allowing the passage of moisture vapor. The use of such material as a cover of insulation is described in U.S. Pat. No. 5,472,760 to Norvell, incorporated by reference. It is believed that it may be most preferable to coat the expanded PTFE material with a microemulsion polymerization material, such as that described in U.S. Pat. No. 5,376,441, 5,385,694, and 5,460, 872 all to Wu, et al., and all incorporated by reference.

In order to prevent condensed liquid from passing into the packaged insulation 10, all exposed edges 20 around the periphery of the package should be sealed. This sealing may be accomplished through any conventional method, including through use of an adhesive, use of seam sealing tape, heat or ultrasonic sealing of the seams, etc.

As has been explained, while the entire package may be readily sealed in the manner described, any penetration of the cover in order to hang the cover on a hook or the like compromises the sealing process and allows liquid to penetrate into the insulation material. To prevent this from occurring, the insulation cover of the present invention includes a sealed region 22 where the top cover layer 14 and the bottom cover layer 16 are sealed directly together. By forming a sealed region 22 in this manner, an opening 24 can be easily made through the sealed region without risk that liquid might seep around the opening 24 into the insulation material. As can be seen, when a sealed region 22 is formed in this manner, a margin 23a, 23b is provided on either side of the opening 24 that provides a high degree of confidence that liquid will not leak into the insulation package. Generally, this margin 23 area should be at least 0.5 to 1 cm or more in width.

Accordingly, the insulation manufacturer may readily supply one or more openings 24 through the sealed region 22 to accommodate anticipated user's mounting needs. Additionally or alternatively, sealed regions 22 can be provided in the insulation that will allow users to punch or cut their own openings as might be necessary.

Figure 3:
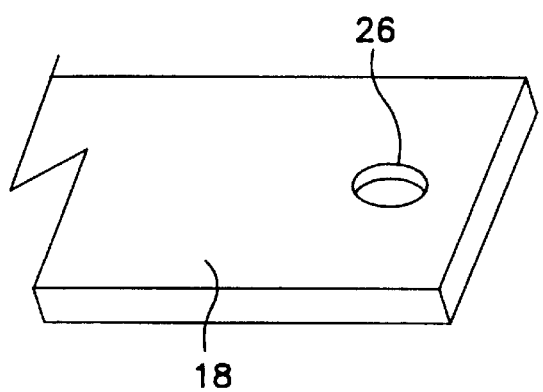
FIG. 3 is a three-quarter isometric view of a insulative material used in the insulation package of the present invention.

The preferred process of practicing the present invention is illustrated in FIG. 3 through 6 and comprises the following steps. First, as is shown in FIG. 3, a segment of insulation material 18, preferably made from fiberglass, foam, or other common insulation, is cut to the appropriate shape and size for an insulation package or "blanket." At a predetermined site, a hole 26 is made through the entire insulation material. For most common mounting purposes the hole 26 will be generally circular and will measure between 1 and 4 cm in diameter. With fiberglass insulation and similar materials, such a hole can be easily made using a cutting blade, a hole punch, or similar cutting device.

As is shown in FIG. 5, the insulation may then be inserted into a cover 12. The cover may comprise two separate pieces of material that is then sealed around the insulation, or can be partially sealed together prior to insertion of the insulation material 18. In the example illustrated, the cover 12 comprises two pieces of material, top cover 14 and bottom cover 16, that are partially sealed together on three sides 28a, 28b, 28c, in a pillow case fashion. In this manner, the insulation material 18 can be slid into the partially sealed cover 12 and the cover can then be sealed on its remaining side 28d to form a water-tight package.

The location of the hole 26, now encased within the cover, is apparent visually through the cover because of the darker visual contrast with the remaining cover, and it can also be located tactually by feeling for the location of the hole.

In order to form a sealed region 22, a tight contact between the top cover 14 and the bottom cover 16 must be established. One method of achieving such a contact is to employ a jig 30, such as that shown in FIG. 4. The jig 30 comprises a base 32 and a protuberance 34. To make sealing easier, the protuberance 34 can be dimensioned to be approximately the same cross-sectional shape as the desired sealed region 22. For forming a circular hold, the protuberance can be formed from a cylindrical dow, such as one made from metal, plastic, wood, or the like, with a diameter of 1 to 4 cm and a height of 2 to 10 cm or more. A resilient pad 36 may be provided on top of the protuberance 34, such as one made from silicone rubber or the like, to create a more conformable sealing surface. It should be evident that several protuberances 34 of varying heights and/or dimensions can be installed on the base 32, so that varying thicknesses of insulation can be accommodated and/or different dimensions of sealed regions can formed.

As is shown in FIG. 6, in use the hole location is placed over a protuberance 34, with the bottom cover 16 placed over the top of the protuberance 32 at the hole location and the laminate layer slightly pushed up within the interior of the hole. The top cover 14 is then pushed down to meet the bottom layer, so both segments are sitting atop of one another against the protuberance.

The top and bottom covers can then be sealed together to form the sealed region 22 through a variety of methods. In its simplest form, an adhesive can be provided between the top and bottom covers in the area to be sealed and the covers can be sealed together through pressure applied against the protuberance 34. A seal also can be established by way of a welding device, such as those employing heat or ultrasonic energy. For example, heat can be applied through a fixture 36 that will form a bond between the top and bottom covers.

One suitable device for providing such a seal is a Weller Sealing Station, available from Newark Electronics of Newark, Del. This device will form a circular seal by affixing a circular shape to a heated tip so that the resulting unit now looks like a branding iron, the circular segment being one half inch to one and one half inches in diameter. The waterproof seal is made by applying pressure with the heated circular tip to the top layer of laminate that is sitting on top of the second layer of laminate, which in turn is centered on top of the silicone pad 36 on the protuberance 34. The dwell time needed to make a waterproof circular seal is from three to ten seconds, with the heat setting at between 300° C. to 450° C.

A waterproof, circular heat seal results, centered within the hole punched out of the insulation material. The seal is from one half inch to one and one half inches in diameter. The center of this seal is easily pierced with an attachment device without destroying the integrity of the remainder of the waterproof seal surrounding it.

This approach to sealing around necessary holes, slits and openings in the insulation can be duplicated by cutting out the segment of the insulation needing to be opened up or folded back. The insulation is then put within the external cover, which is already sealed at its periphery on three sides. A waterproof seal is then made with heat and pressure as in the previous example, with the sealed margins following the appropriate shape of the slit or opening. In addition, a die in conjunction with a heat press, and shaped to be the same configuration as the slit or hole can be used to make the seal.

Examples of these other constructions are shown in FIGS. 7 and 8. FIG. 7 shows an insulation package 10 of the present invention that includes an elongated sealed region 38 having a slit opening 40 along it. This construction is particularly useful where wires or conduits must be threaded around the insulation and/or where the insulation must be bent or folded for ease in installation or for inspection purposes.

Two other embodiments of the sealed regions of the present invention are shown in FIG. 8. Another elongated sealed region 42 is provided, this one demonstrating that one or more bends 44 can be created on the face of the insulation package 10. Again, a slit 46 is included along the sealed region 42.

Still another embodiment of a sealed region 48 is shown in FIG. 8. In this instance, the sealed region 48 is formed on a tab 50 protruding from one side of the insulation package 10. The tab 50 comprises merely two layers 52, 54 of material sealed together with no insulation included between the two layers of material. A circular opening 56 is included in the sealed region 48 to allow mounting of the insulation package 10 via tab 50 on suitable hooks, etc.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An insulation package that comprises
   insulation material including a hole therein;
   a liquid impenetrable cover comprising expanded PTFE laminate sealed around the insulation material, the cover including a top and a bottom layer;
   at least one sealed region in the cover whereby the top and bottom layers are sealed together within the hole in the insulation, the sealed region having a sufficient margin around it to allow the seal region to be penetrated by an opening without allowing liquid to seep into the insulation.

2. The insulation package of claim 1 wherein the sealed region comprises a generally circular area.

3. The insulation package of claim 2 wherein the sealed region has an opening formed therein.

4. The insulation package of claim 1 wherein the sealed region comprises an elongated area.

5. The insulation package of claim 4 wherein the sealed region has an opening formed therein.

6. The insulation package of claim 5 wherein the opening comprises a slit.

* * * * *